J. I. PEASE.
Velocipede.
No. 97,110.
Patented Nov. 23, 1869.
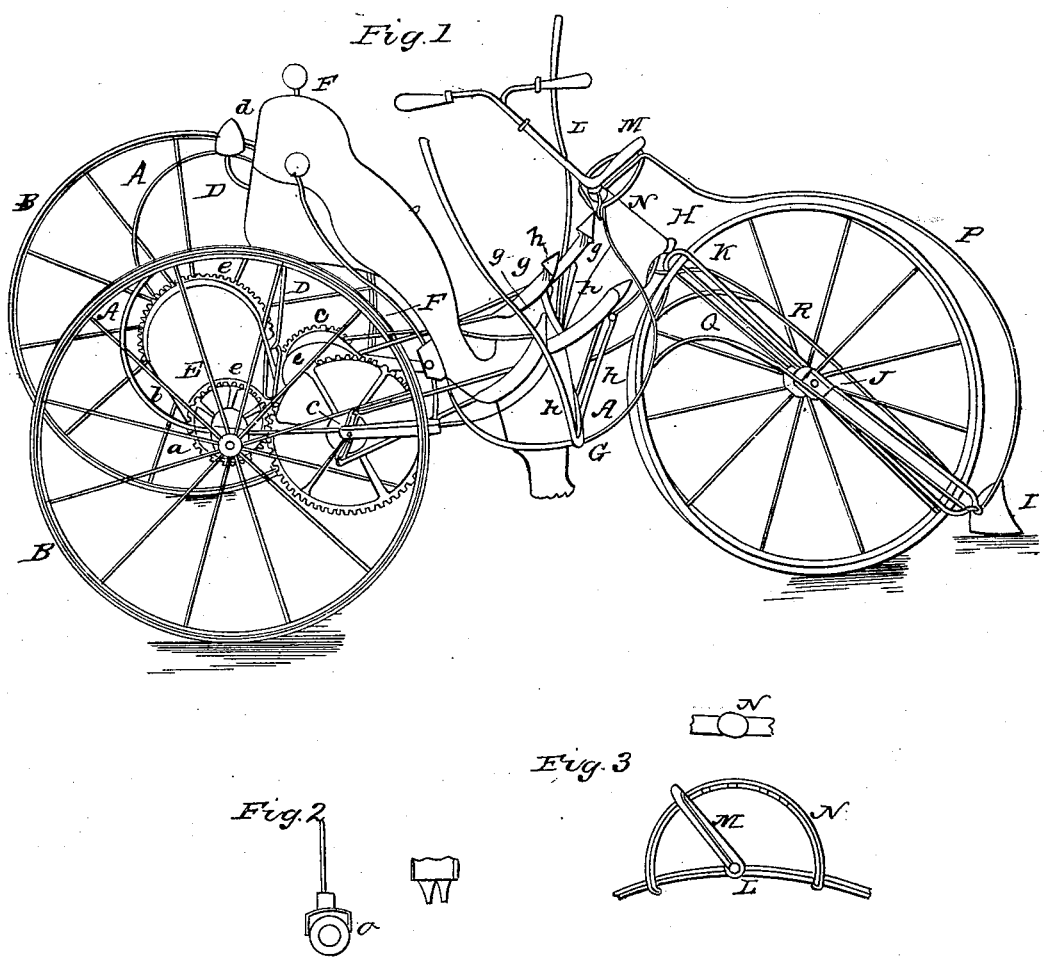

United States Patent Office.

JOSEPH IVES PEASE, OF STOCKBRIDGE, MASSACHUSETTS.

Letters Patent No. 97,110, dated November 23, 1869.

IMPROVEMENT IN VELOCIPEDES.

The Schedule referred to in these Letters Patent and making part of the same.

To all whom it may concern:

Be it known that I, JOSEPH IVES PEASE, of Stockbridge, in the county of Berkshire, State of Massachusetts, have invented a new and useful Improvement in the Machine known as the Velocipede, thereby securing an increased power in ascending heavy grades, a high degree of speed on level or descending ground, and a facility and safety in turning short curves, which, I believe, has not before been attained; and I do hereby declare that the following is a full, clear, and exact description of the construction and operation of the same, reference being had to the accompanying drawings, and the letters of reference marked thereon, making a part of this specification.

The machine may be described as follows:

On a light, flexible frame, of wood or metal, A A, is placed the seat, for one or two persons.

Below this, and supported on bearings at $a$, are the two driving-wheels B B, secured to their shaft.

On this shaft, between the wheels, is a cone-shaped drum or pulley, $b$, which is connected, by the cross-belt $c$, to a similar pulley on the crank-shaft C, and operated thereby.

In the space between the pulleys aforesaid, and depending from the back of the seat, is the belt-shifter D, which serves to run the belt to the large or small ends of the cone-pulleys, or to the still wheel E. It also serves as a brake, by pressing on the knob $d$, at its top.

At either end of the pulleys are fixed spur-gears, $e$ $e$ $e$, corresponding somewhat, in diameters, to the cones, and, like them, intended to secure a fast or slow motion, as speed or power is most desired.

They are put in or out of gear by the two levers F F, attached to bearings on the crank-shaft.

To the cranks, which are double, are fixed the four treadles $g$ $g$ $g$ $g$, supported at the other ends on yokes or inverted pendulums, $h$ $h$ $h$ $h$, swinging upon the transverse bar G. The two outermost of these yokes are carried up to a proper height, to be used as hand-levers, as propulsion by hand or foot is preferred.

In front of the seat, and pivoted in the dash-board at H, and stepped in the shoe I, is the yoke or frame K, in which is axled the guide-wheel J. This yoke or frame is placed at an angle of about forty-five degrees, and when turned by the tiller or cross-bar at its top, serves to bring the periphery of the guide-wheel in track with one or the other of the driving-wheels, thus bracing and acting against the centrifugal force, and greatly lessening the danger of an upsetting when a short or rapid turn is made.

Below the tiller, and at right angles to the stand-post L, to which it is affixed, is projected the arm M, moving over the semicircle N, and dropping into shallow notches or scallops, and locking the yoke aforesaid, in any desired position, for a straight or curved course. A slight downward pressure on the tiller disengages the arm, and gives the guidance to the hand.

The three wheels are shod with rubber tubing, held in place in the grooved tire or felloe, by a metallic rod passing through its entire length, and tightened by a clench-joint or by a right-and-left screw, thereby allowing the tubing to be turned or renewed, as wear or breakage may require.

A cross-section of felloe, tire, rubber tubing, and tightener, is shown at O, fig. 2.

Claims.

What I claim as my invention, and desire to secure by Letters Patent, is—

1. The elongated yoke or frame K, extending diametrically across and supporting the guide-wheel J, and pivoted in the dash-board H, and stepped in the shoe I, together with the braces $p$ $q$ $r$, holding said shoe in place, the arm M, projecting from and at right angles to the turn-post, traversing over and locking into the semicircle N, substantially as described.

2. In combination with cone-pulleys $b$ $b$, the belt-shifter and brake D, the fast and slow gears $e$ $c$ $c$ $e$, combined and used together, as and for the purposes set forth.

3. The treadles $g$ $g$, hinging upon the frames or yokes $h$ $h$, and attached to the cranks, as described.

4. The wheels shod with rubber tubing, which tubing is held secure within a grooved tire or felloe, by a metallic rod, passing through its entire length, and tightened by a right-and-left screw or its equivalent,

JOSEPH IVES PEASE.

Witnesses:
NELSON CROSS,
ROGER H. LYON.